US012567517B2

(12) United States Patent
Bates et al.

(10) Patent No.: US 12,567,517 B2
(45) Date of Patent: Mar. 3, 2026

(54) LOW-SMOKE, FLAME-RETARDANT DATA COMMUNICATION CABLES

(71) Applicant: Prysmian S.p.A., Milan (IT)

(72) Inventors: Eric W. Bates, Lafayette, IN (US); Stephen A. Thwaites, Walton, KY (US); James D. Malkemus, Union, KY (US)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 18/297,990

(22) Filed: Apr. 10, 2023

(65) Prior Publication Data

US 2024/0339245 A1 Oct. 10, 2024

(51) Int. Cl.
*H01B 7/295* (2006.01)
*H01B 3/44* (2006.01)
*H01B 11/10* (2006.01)

(52) U.S. Cl.
CPC ............. *H01B 7/295* (2013.01); *H01B 3/448* (2013.01); *H01B 11/1058* (2013.01)

(58) Field of Classification Search
CPC ................................ H01B 7/295; H01B 11/04
See application file for complete search history.

(56) References Cited

U.S. PATENT DOCUMENTS

| | | | | |
|---|---|---|---|---|
| 5,493,071 | A * | 2/1996 | Newmoyer ............ | H01B 7/295 174/34 |
| 5,770,820 | A | 6/1998 | Nelson et al. | |
| 5,814,406 | A | 9/1998 | Newmoyer | |
| 5,936,205 | A | 8/1999 | Newmoyer | |
| 6,852,921 | B1 * | 2/2005 | Koike .................... | H01B 7/295 525/88 |
| 9,424,963 | B1 * | 8/2016 | McNutt .................. | H01B 11/02 |
| 10,854,356 | B2 * | 12/2020 | Scrima ..................... | C08K 3/22 |
| 2007/0129498 | A1 * | 6/2007 | Curry ...................... | C09J 151/06 525/242 |
| 2011/0034634 | A1 * | 2/2011 | Grein .................... | C08F 210/06 502/155 |
| 2021/0065926 | A1 | 3/2021 | Kogo | |

FOREIGN PATENT DOCUMENTS

| | | | | |
|---|---|---|---|---|
| EP | 0778589 | A2 | | 11/1997 |
| EP | 3971913 | A1 | | 3/2022 |
| JP | 2015-151537 | | * | 8/2015 |
| KR | 102201364 | B1 | | 1/2021 |
| WO | 20100024602 | A2 | | 3/2010 |

OTHER PUBLICATIONS

Marsitzky, Dirk; Extended European Search Report issued in European Pat. App. No. 24169488.4; Aug. 19, 2024; 6 pages.

* cited by examiner

*Primary Examiner* — Chau N Nguyen
(74) *Attorney, Agent, or Firm* — FBT GIBBONS LLP

(57) ABSTRACT

A data communication cable includes a jacket layer surrounding a cable core, which includes at least one pair of twisted electric conductors electrically insulated with a flame-retardant polypropylene (FRPP)-based material. The FRPP-based material includes a char enhancer, a halogenated flame retardant; and a flame retardant additive. The FRPP-based material is free from flame-retardant hydrated mineral filler.

16 Claims, 3 Drawing Sheets

LOW-SMOKE, FLAME-RETARDANT DATA COMMUNICATION CABLES

TECHNICAL FIELD

The present application relates to data communication cables. More specifically, the present application relates to data communication cables for use in a plenum, the data communication cables having twisted pairs of insulated conductors with at least one pair of conductors being insulated with a flame retardant polypropylene ("FRPP")-based material.

BACKGROUND

Data communication cables for use in plenums must meet strict requirements with respect to flame propagation and smoke emission while providing excellent electrical properties. In order to satisfy such standards, the electric insulation for the conductors of many conventional data communication cables is formed from fluoropolymers, but fluoropolymers can tend to be expensive, relative to other materials. Providing less expensive materials for the electric insulation that allow the data communication cable to exhibit desired properties can be challenging. For example, FRPP-based materials have been used to provide at least a portion of the electric insulation included in data communication cables, and such usage typically requires a substantial amount of inorganic flame retardant filler in the polypropylene base for the data communication cables to pass flame propagation and smoke emission standards, however, and the inclusion of such substantial amounts of inorganic flame retardant filler may increase the dielectric constant of the FRPP-based materials thus decreasing their performance as electrically insulating materials.

U.S. Pat. No. 5,936,205 describes a communication cable for use in a plenum comprising a plurality of twisted pairs of electrical conductors insulated with fluorinated ethylene propylene ("FEP"), and at least one additional twisted pair of electrical conductors insulated with an olefin-based compound. The olefin-based material is filled with flame retardants and char enhancers to minimize smoke and flame evolution. For example, the insulation material may contain 0-5 parts per hundred (pph) antimony trioxide flame retardant, 0-30 pph halogen flame retardant, up to 120 pph mineral filler, such as magnesium carbonate or magnesium hydroxide, and/or up to 5 pph silicate char enhancers, such as talc.

Korean Patent Publication No. 102201364 describes a plenum-grade, unshielded twisted pair ("UTP") cable comprising a flame-retardant polyolefin composition. The base resin may include 50 to 90 parts, by weight, of a polyolefin resin, 10 to 50 parts, by weight, of a thermoplastic polyolefin elastomer resin based on a total of 100 parts, by weight, and 2 to 10 parts, by weight, of a reactive polyolefin into which a polar group is introduced. The flame-retardant polyolefin composition may include 50 to 100 parts, by weight, of a metal hydroxide flame retardant, such as magnesium hydroxide or aluminum hydroxide, and 5 to 100 parts, by weight, of a flame retardant aid, such as a halogen-based flame retardant or an antimony-based flame retardant.

The provision of a data communication cable for use in plenums with a reduced cost and with performant electrically insulating layer/s is desired.

SUMMARY

The applicant found that a data communication cable comprising a plurality of electric conductors, at least one of which is insulated with a specific flame-retardant polypropylene base material, is suitable for compliance with the stringent standards for use in plenums, while being free from commonly used flame-retardant hydrated mineral filler/s, like magnesium hydroxide or aluminum hydroxide. Such specific flame-retardant polypropylene base material provides a layer with suitable electrically insulating properties.

Accordingly, an exemplary embodiment of the present disclosure provides a data communication cable for use in a plenum having a cable core and jacket layer surrounding the cable core. The cable core includes at least one pair of twisted electric conductors electrically insulated with a flame-retardant polypropylene (FRPP)-based material comprising a char enhancer; a halogenated flame retardant; and a flame retardant additive; and wherein the FRPP-based material is free from flame-retardant hydrated mineral filler.

In an embodiment, all the pairs of twisted electric conductors are electrically insulated with the FRPP-based material.

In an embodiment, the cable core includes at least one pair of twisted electric conductors electrically insulated with a FRPP-based material and at least one pair of twisted electric conductors electrically insulated with a fluoropolymer material.

The fluoropolymer material suitable as electric insulation may be selected from FEP, ethylene chlorotrifluoroethylene ("ECTFE"), and a perfluoropolymer, such as methylfluoroalkoxy ("MFA") or perfluoroalkoxy alkane ("PFA"), among others. In an embodiment, the fluoropolymer material suitable as electric insulation is FEP.

In an embodiment, the FRPP-based material suitable as electric insulation in the present data communication cable includes at least one polypropylene copolymer amounting to 100 phr (parts per hundred rubber) as polypropylene base.

A polypropylene copolymer suitable for use in the present data communication cable may be a heterophase polypropylene copolymer. In the present disclosure, the term "heterophase polypropylene copolymers" refers to a copolymer formed by a substantially crystalline matrix of polypropylene and an ethylene-propylene rubber phase dispersed therein.

In an embodiment, the FRPP-based material suitable as electric insulation in the present data communication cable is made of a polymer base including at least one polypropylene copolymer and at least one polypropylene homopolymer or copolymer suitably modified with a polar group (hereinafter also referred to as "polar-modified polypropylene homopolymer or copolymer"). For example, the polypropylene homopolymer or copolymer may be modified by grafting an anhydride or an acrylic group. In such embodiments, the polymer base may comprise 80-99 phr of a polypropylene copolymer (e.g., a polypropylene heterophase copolymer) and 1-20 phr of a polar-modified polypropylene homopolymer or copolymer.

In an embodiment, the FRPP-based material suitable as electric insulation in the present data communication cable is made of a polymer base including at least one polypropylene copolymer and at least one polypropylene homopolymer. In one embodiment, the polymer base may include 5-25 phr of a polypropylene homopolymer, with the remaining portion of the polymer base being formed from a polypropylene copolymer (e.g., polypropylene heterophase copolymer).

In an embodiment, the FRPP-based material suitable as electric insulation in the present data communication cable is made of a polymer base including at least one polypropylene copolymer, at least one polar-modified polypropylene homopolymer or copolymer, and at least one polypropylene homopolymer. In one embodiment, the polymer base may include 5-25 phr of a polypropylene homopolymer, 1-20 phr of a polar-modified polypropylene homopolymer or copolymer, and the remaining portion of the polymer base being formed from a polypropylene copolymer (e.g., polypropylene heterophase copolymer).

In an embodiment, the FRPP-based material insulating at least one electric conductor of the present data communication cable may include a char enhancer. A char enhancer suitable for the present data communication cable may include talc, silicone fluids, silica, and/or mica. The FRPP-based material may include from 20 to 60 phr of the char enhancer.

In an embodiment, the FRPP-based material insulating at least one electric conductor of the present data communication cable may include a halogenated flame-retardant. A halogenated flame retardant suitable for the present data communication cable may include bromine, chlorine, fluorine, or iodine. The FRPP-based material may include from 25 to 60 phr of the halogenated flame retardant.

In an embodiment, the FRPP-based material insulating at least one electric conductor of the present data communication cable may include a flame-retardant additive. A flame retardant additive suitable for the present data communication cable may include at least one of antimony trioxide, a mixture of antimony trioxide and zinc borate, and a mixture of magnesium oxide and zinc oxide. The FRPP-based material may include the flame-retardant additive in an amount that is 25-30% of the amount of the halogenated flame-retardant.

In an embodiment, the FRPP-based material insulating at least one electric conductor of the present data communication cable may be free from flame-retardant hydrated mineral filler, such as magnesium hydroxide (both synthetic and naturally occurring), aluminum hydroxide, magnesium carbonate, mixed magnesium/calcium carbonates and hydroxides, such as naturally occurring mixtures of huntite, boehmite, magnesite, and hydromagnesite.

In an embodiment, both the fluoropolymer material and the FRPP-based material in the cable of the present disclosure are solid. As referred to herein, the use of the term "solid" indicates that a material is not foamed or expanded.

In an embodiment, the jacket layer of the cable of the present disclosure may be formed of a polymer material having an oxygen index of at least 40%, and in certain embodiments, of at least 45%, as measured in accordance with American Society for Testing and Materials ("ASTM") D2863 (2012).

In an embodiment, the cable core further includes a separator. The separator may be a tape (i.e., a "flat separator") or an element having a cross-shaped cross-section (i.e., a "cross-web separator"). The separator may include a flame-retardant, low-smoke polymer material, such as a low-smoke polyvinylchloride ("PVC") or a flame-retardant, halogen-free polyolefin of polyethersulfone.

The present disclosure may also provide a data communication cable for use in plenum having a cable core and jacket layer surrounding the cable core. The cable core includes at least one pair of twisted electric conductors electrically insulated with a FRPP-based material having a dielectric constant (ε) of less than 2.6 as measured according to ASTM 4566-98. In particular, the dielectric constant is back calculated starting from the capacitance according to the formula $[1/(0.018\times\mathrm{Ln}(D/d)/\varepsilon)]$ where D=insulation outer diameter and d=diameter of copper conductor.

Other objects, advantages and salient features of the disclosure will become apparent from the following detailed description, which, taken in conjunction with the annexed drawings, discloses various embodiments of the present disclosure.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings.

DETAILED DESCRIPTION OF THE EXEMPLARY EMBODIMENTS

For the purpose of the present description and of the appended claims, except where otherwise indicated, all numbers expressing amounts, quantities, percentages, and so forth, are to be understood as being modified in all instances by the term "about." Also, all ranges include any combination of the maximum and minimum points disclosed and include any intermediate ranges therein, which may or may not be specifically enumerated herein.

The present disclosure, in at least one of the mentioned aspects, can be implemented according to one or more of the present embodiments, optionally combined together.

For the purpose of the present description and of the appended claims, the words "a" or "an" should be read to include one or at least one and the singular also includes the plural unless it is obvious that it is meant otherwise. This is done merely for convenience and to give a general sense of the disclosure.

Data communication cables for use in plenums, including those described herein, may be required to meet several standards. For example, such data communication cables may be required to pass testing relating to flame propagation and smoke emission, such as the Underwriter's Laboratory ("UL") 1581 (2001) VW-1 flame test, UL 444 (2002) plenum testing, and testing according to the National Fire Protection Association ("NFPA") standards (e.g., NFPA 262, 2011). Such data communication cables may be also required to exhibit strong electrical insulating properties, such as a sufficiently low dielectric constant. Such data communication cables can further be required meet the standards of ANSI/TIA-568.2-D (2018) of the American National Standards Institute ("ANSI") and the Telecommunications Industry Association ("TIA") with respect to, for example, Category 5e, Category 6, and Category 6A cables.

The data communication cables described herein can pass VW-1 flame testing and testing for UL 444 (2002) and NFPA 262 (2011), meet the standards for a Category 5e, Category 6, and Category 6A cables under ANSI/TIA-568.2-D (2018), exhibit a dielectric constant of less than 2.6 (as measured according to ASTM 4566-98) and suitable mechanical properties, such as tensile strength, elongation at break, and modulus.

Among other things, insulation having a sufficiently low dielectric constant can allow for the reduction of insulation wall thickness and diameter, thereby resulting in a lesser volume of combustible material. A lower dielectric constant can also allow for faster processing speeds and tighter pair lays with the data communication cable.

Figure 1:
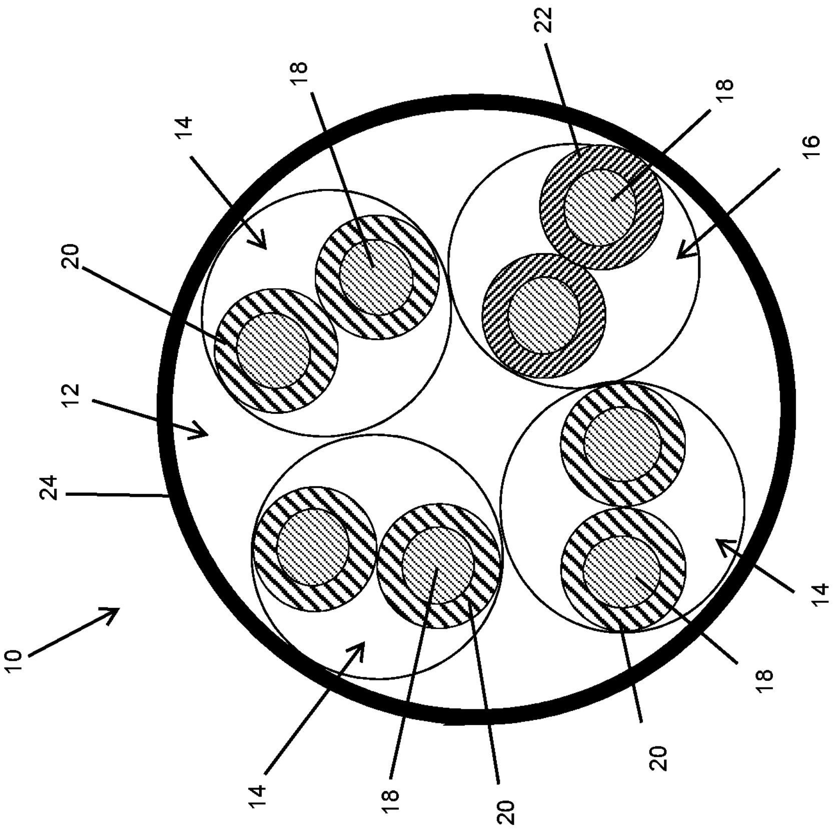
FIG. 1 depicts a cross-sectional view of a data communication cable having a cable core including three pairs of twisted electric conductors electrically insulated with a fluoropolymer material (hereinafter also referred to as "first pair/s") and one pair of twisted electric conductors electrically insulated with a FRPP-based material according to the present disclosure (hereinafter also referred to as "second pair/s"), the cable core being surrounded by a jacket layer according to one embodiment.

An illustrative data communication cable is depicted in FIG. 1. The data communication cable 10 in FIG. 1 includes a cable core 12 having four pairs (e.g., 14, 16). Each pair comprises two electric conductors 18, each surrounded by an electrically insulating layer (e.g., 20, 22). As shown in FIG. 1, the insulating layer 20 for three of the pairs 14 (i.e., "first pair/s") is formed from a fluoropolymer material, while the insulating layer 22 for the pair 16 (i.e., "second pair") is formed from a FRPP-based material comprising a polypropylene base, a char enhancer, a halogenated flame retardant, and a flame retardant additive according to the present disclosure. The data communication cable further includes a jacket layer 24 surrounding the cable core 12. As can be appreciated, variations are possible.

In certain embodiments, the electric conductors can be solid or stranded and can be formed of any suitable electrically conductive metal including, for example, copper, aluminum, or an alloy thereof. In certain embodiments, the electric conductors can be coated with a corrosion resistant metal, such as tin, to facilitate termination of a communication cable in areas with harsh environmental conditions (e.g., hot or humid areas, etc.). In certain embodiments, the electric conductors can advantageously be formed of copper due to copper's high electrical conductivity relative to volume.

As can be appreciated, stranded conductors can be advantageous in certain embodiments due to the mechanical and electrical advantages exhibited by stranded conductors. For example, stranded conductors can exhibit increased flexibility and conductivity compared to solid ones of identical gauge. In certain embodiments, the electric conductors can be a stranded copper conductor.

Generally, the insulated electric conductors in a data communication cable can be of any suitable wire gauge. For example, in certain embodiments, the insulated wires can be sized in accordance with American Wire Gauge ("AWG") standards and each wire can have a size between 14 AWG and 40 AWG. For example, suitable data communication cables can include a four-pair 23 AWG configuration. As can be appreciated, selection of the wire gauge can vary depending on factors such as the desired cable operating distance, the desired electrical performance, and physical parameters such as the thickness of the data communication cable.

In certain embodiments, at least one pair comprises two electric conductors insulated by a fluoropolymer material. For example, suitable fluoropolymer materials can include FEP, ECTFE, MFA, and PFA, among others. Relative to other insulation materials, such as polyolefins, for example, fluoropolymers can be advantageous due to the superior electrical properties, especially in terms of the dielectric properties exhibited by such materials. In one embodiment, at least one pair includes two electric conductors insulated with FEP.

In certain embodiments, at least one pair includes two electric conductors insulated with a FRPP-based material comprising a polypropylene base, a char enhancer, a halogenated flame retardant, and a flame retardant additive.

In certain embodiments, the FRPP-based material suitable as electric insulation in the present data communication cable may include at least one polypropylene heterophase copolymer.

In an embodiment, the FRPP-based material may include a polypropylene heterophase copolymer as a sole polypropylene base, such that the polypropylene heterophase copolymer may be present in an amount of 100 phr.

In another embodiment, the polypropylene base of the FRPP-based material of the present disclosure may include a minor amount of a polar-modified polypropylene homopolymer or copolymer. In such embodiments, the polar-modified polypropylene homopolymer or copolymer can be present in the polypropylene base in an amount from 1 phr to 20 phr: in certain embodiments, from 3 phr to 15 phr; and in certain embodiments, from 5 phr to 10 phr. Suitable examples of the polar-modified polypropylene homopolymer or copolymer can include maleic anhydride-grafted polypropylene. It will be appreciated that any of a variety of suitable forms of polar-modified polypropylene can be employed in the FRPP-based material.

In another embodiment, the polypropylene base of the FRPP-based material of the present disclosure may include a minor amount of a polypropylene homopolymer. In such embodiments, the polypropylene homopolymer can be present in the polypropylene base in an amount from about 5 phr to 25 phr: in certain embodiments, from 8 phr to 20 phr; and in certain embodiments, from 10 phr to 15 phr. It will be appreciated that any of a variety of suitable forms of polar-modified polypropylene can be employed in the FRPP-based material.

In certain embodiments, the FRPP-based material can include from about 55 phr to about 94 phr, of polypropylene heterophase copolymer, from about 5 phr to about 25 phr, of the polypropylene homopolymer, and from about 1 phr to about 20 phr, of the polar-modified polypropylene homopolymer or copolymer.

The FRPP-based material can further include a char former. Suitable char formers can include talc, silicone, silica, and mica. In one embodiment, the char former can be talc. The FRPP-based material can include, in certain embodiments, about 30 phr or more of the char former.

The FRPP-based material can further include a halogenated flame retardant. Suitable halogenated flame retardant can include brominated phthalimides, such as ethylenebistetra-bromophthalimide, decabromodiphenyl ethane ("DBDPE"), decabromodiphenyl oxide ("DBDPO"), and chlorinated products, such as Dechlorane Plus® 25 (marketed by OxyChem, Dallas, TX). The FRPP-based material can include, in certain embodiments, about 25 phr, or more of the halogenated flame retardant.

The FRPP-based material can further include a flame retardant additive. Suitable flame retardant additives can include antimony oxides, a mixture of antimony trioxide and zinc borate and/or and a mixture magnesium oxide/zinc oxide. The FRPP-based material can include an amount of the flame retardant additive that is, in certain embodiments, about 20% to about 35%; in certain embodiments, about 22% to about 32%; in certain embodiments, about 25% to about 30%; and in certain embodiments, about 27% to about 29% of the amount of the halogenated flame retardant.

In certain embodiments, the FRPP-based material can be free of a flame retardant hydrated mineral filler. For example, in certain embodiments, the FRPP-based material can be free of a metal hydroxide and/or metal carbonate, such as magnesium hydroxide (both synthetic and naturally occurring), aluminum hydroxide, hydrated magnesium carbonate, hydrated calcium carbonate, mixed magnesium/calcium carbonates and hydroxides, such as naturally occurring mixtures of huntite, boehmite, magnesite and hydromagnesite.

In certain embodiments, the FRPP-based material can further include one or more antioxidants. Suitable antioxidants for inclusion in the insulation composition can include, for example, amine-antioxidants, such as 4,4'-dioctyl diphenylamine, N,N'-diphenyl-p-phenylenediamine, and polymers of 2,2,4-trimethyl-1,2-dihydroquinoline: phenolic antioxidants, such as thiodiethylene bis[3-(3,5-di-tert-butyl-4-hydroxyphenyl)-propionate], 4,4'-thiobis(2-tert-butyl-5-methylphenol), 2,2'-thiobis(4-methyl-6-tert-butyl-phenol), benzenepropanoic acid, 3,5-bis(1,1-dimethylethyl)4-hydroxy benzenepropanoic acid, 3,5-bis(1,1-dimethylethyl)-4-hydroxy-C13-15 branched and linear alkyl esters, 3,5-di-tert-butyl-4hydroxyhydrocinnamic acid C7-9-branched alkyl ester, 2,4-dimethyl-6-t-butylphenol tetrakis{methylene-3-(3',5'-ditert-butyl-4'-hydroxyphenol) propionate}methane or tetrakis {methylene3-(3',5'-ditert-butyl-4'-hydrocinnamate}methane, 1,1,3tris(2-methyl-4-hydroxyl-5-butylphenyl) butane, 2,5, di t-amyl hydroquinone, 1,3,5-tri methyl2,4,6tris(3,5di tert butyl-4-hydroxybenzyl) benzene, 1,3,5tris(3,5di-tert-butyl-4-hydroxybenzyl)isocyanurate, 2,2-methyl-ene-bis-(4-methyl-6-tert butyl-phenol), 6,6'-di-tert-butyl-2,2'-thiodi-p-cresol or 2,2'-thiobis(4-methyl-6-tert-butylphenol), 2,2-ethylenebis(4,6-di-t-butylphenol), triethyleneglycol bis{3-(3-t-butyl-4-hydroxy-5methylphenyl)propionate}, 1,3,5-tris(4tert-butyl-3-hydroxy-2,6-dimethyl-benzyl)-1,3,5-triazine-2,4,6-(1H,3H,5H)trione, 2,2-methylenebis{6-(1-methylcyclohexyl)-p-cresol}; sterically hindered phenolic antioxidants such as pentaerythritol tetrakis(3-(3,5-di-tert-butyl-4-hydroxyphenyl)propionate) and 2',3-bis[[3-[3,5-di-tert-butyl-4-hydroxyphenyl]-propionyl]]propionohydrazide: hydrolytically stable phosphite antioxidants such as tris(2,4-ditert-butylphenyl)phosphite: toluimidazole, and/or sulfur antioxidants, such as bis(2-methyl-4-(3-n-alkylthiopropionyloxy)-5-t-butylphenyl) sulfide, 2-mercaptobenzimidazole and its zinc salts, pentaerythritol-tetrakis(3-lauryl-thiopropionate), dilauryl thiodipropionate ("DLTDP") or distearyl thiodipropionate ("DSTDP") and combinations thereof. Antioxidants can be included in compositions at concentrations about 5 phr or less of the composition in certain embodiments; from about 0.1 phr to about 4 phr, in certain embodiments; and from about 0.2 phr to about 3 phr, in certain embodiments. In one embodiment, the insulation composition can comprise pentaerythritol tetrakis[3-(3,5-di-tert.butyl-4-hydroxyphenyl)propionate] and/or 2',3-bis[[3-[3,5-di-tert-butyl-4-hydroxyphenyl]propionyl]]propionohydrazide. As can be appreciated, it can be advantageous in certain embodiments to use a blend of multiple antioxidants.

In certain embodiments, the insulation composition can further include one or more metal deactivators. Suitable metal deactivator can include, for example, N,N'-bis(3-(3,5-di-t-butyl-4-hydroxyphenyl)propionyl)hydrazine, 3-(N-salicyloyl)amino-1,2,4-triazole, and/or 2,2'-oxamidobis-(ethyl 3-(3,5-di-t-butyl-4-hydroxyphenyl)propionate). Metal deactivators can be included in compositions at concentrations about 5 parts, by weight, or less of the composition in certain embodiments: from about 0.1 parts to about 4 parts, by weight, in certain embodiments; and from about 0.2 parts to about 3 parts, by weight, in certain embodiments.

In certain embodiments, a processing aid can be included in the FRPP-based material to improve the processability thereof. The processing aid can generally be a lubricant, such as ultra-low molecular weight polyethylene (e.g., polyethylene wax), stearic acid, silicones (e.g., polysiloxane dispersed in polypropylene), anti-static amines, organic amides, ethanolamides, mono- and di-glyceride fatty amines, ethoxylated fatty amines, fatty acids, zinc stearate, stearic acids, palmitic acids, calcium stearate, oligomeric olefin oil, or combinations thereof. In certain embodiments, a lubricant can be included from about 1 part to about 5 parts, by weight: in certain embodiments, from about 2.5 parts to about 4.5 parts, by weight: in certain embodiments, from about 3 parts to about 4 parts, by weight, of the insulation composition.

As shown in FIGS. 1-5, the jacket layer 24 surrounds the cable core 12. In certain embodiments, the jacket layer can be formed of a PVC. The jacket layer can further include flame retardants, as described herein, and/or smoke suppressants and can be lead-free. Alternatively, the jacket layer can also be formed of a fluoropolymer material. For example, suitable fluoropolymer materials can include FEP, ECTFE, MFA, PFA, polyvinylidene fluoride ("PVDF"), among others. It will be appreciated, however, that a jacket layer can be formed from any of a variety of suitable materials like low-smoke, zero-halogen polyolefins and polyethylene. Examples of suitable jacket layers are disclosed in U.S. Pat. No. 10,246,639, which is hereby incorporated by reference.

As can be appreciated, each of the FRPP-based material and jacket layer material described herein can optionally further include additional components. For example, each of the FRPP-based material insulation or jacket layer can further include antioxidants, as described herein: processing aids, as described herein; colorants; and stabilizers in various embodiments. As can be appreciated, any of the additional components can be directly added to compositions forming the respective FRPP-based material insulation or jacket layer described herein or can be introduced using a masterbatch. Generally, any additional components can be included at about 1% to about 10%, by weight, of the respective insulation composition or jacket layer.

Figure 2:
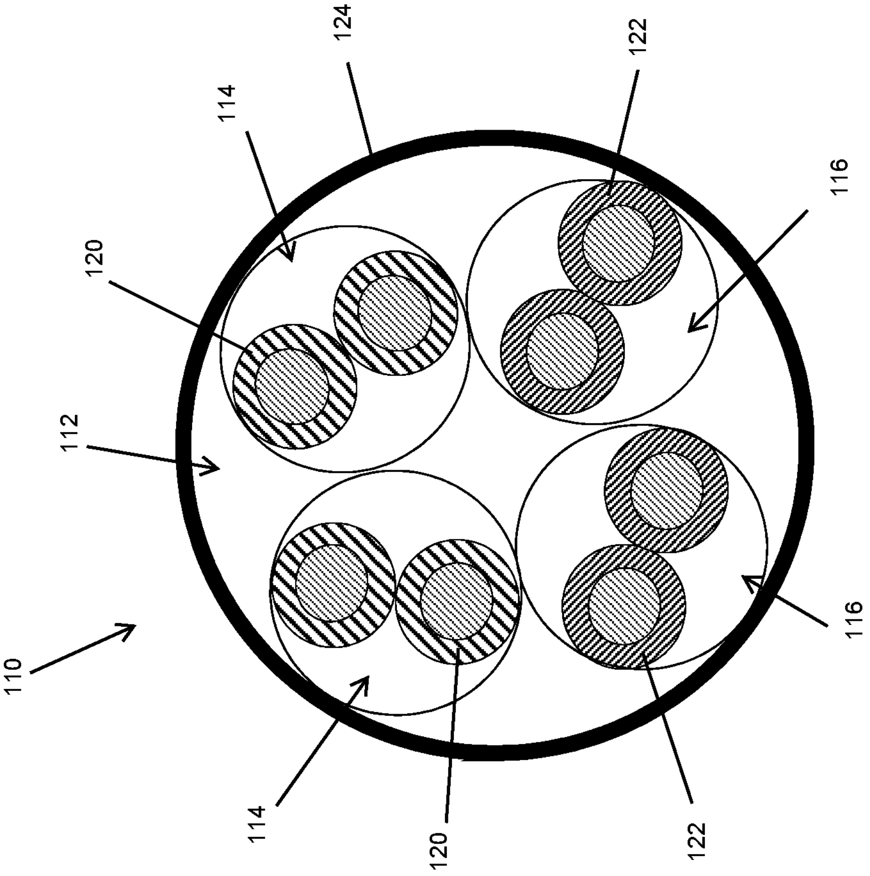
FIG. 2 depicts a cross-sectional view of a data communication cable having a cable core with two first pairs and two second pairs surrounded by a jacket layer according to one embodiment.
Figure 4:
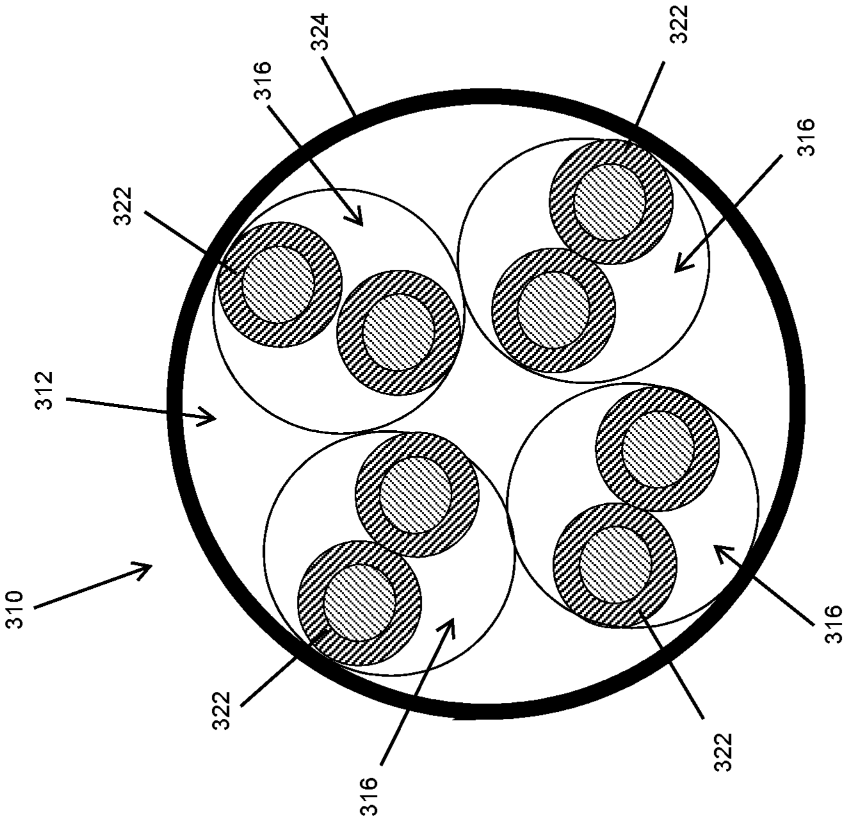
FIG. 4 depicts a cross-sectional view of a data communication cable having a cable core with four second pairs surrounded by a jacket layer according to one embodiment.
Figure 3:
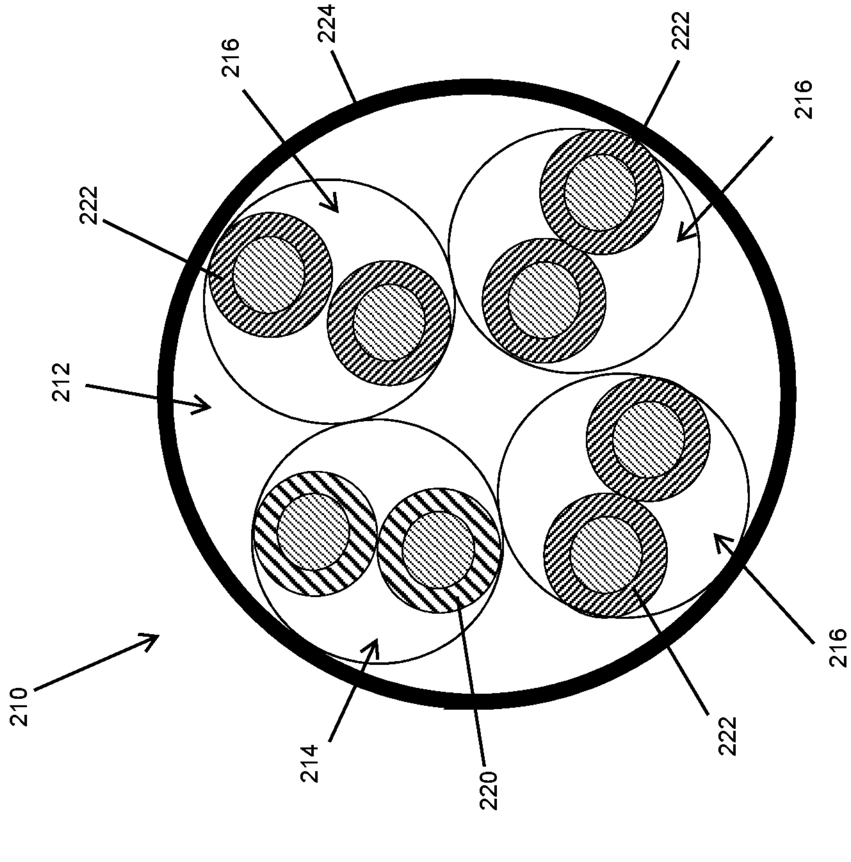
FIG. 3 depicts a cross-sectional view of a data communication cable having a cable core with one first pair and three second pairs surrounded by a jacket layer according to one embodiment.

While FIG. 1 depicts a data communication cable 10 including a cable core 12 having a "3×1" configuration—i.e., the insulation 20 for three of the first pairs 14 is formed from a fluoropolymer material and the insulation 22 for the one second pair 16 is formed from the FRPP-based material insulation composition as described herein—other configurations are possible. For example, FIG. 2 depicts a data communication cable 110 including a cable core 112 having a "2×2" configuration, where the insulation 120 for two of the first pairs 114 is formed from a fluoropolymer material, while the insulation 122 for two of the second pairs 116 is formed from the FRPP-based material. Further, FIG. 3 depicts a data communication cable 210 including a cable core 212 having a "1×3" configuration, where the insulation 220 for the one first pair 214 is formed from a fluoropolymer material, while the insulation 222 for three of the second pairs 216 is formed from the FRPP-based material. In addition, FIG. 4 depicts a data communication cable 310 including a cable core 312 having a "0×4" configuration, where the insulation 322 for all of the pairs of the cable are formed from the FRPP-based material according to the present disclosure, i.e., all of the pairs of the cable 310 are second pairs 316.

Figure 6:
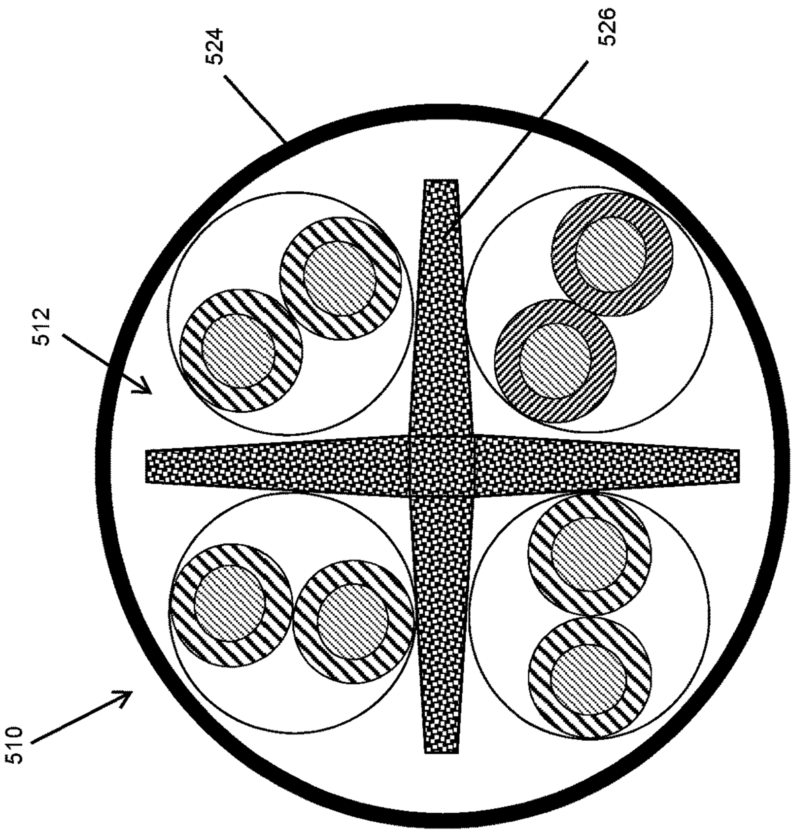
FIG. 6 depicts a cross-sectional view of a data communication cable having a cable core like that of FIG. 1 and further comprising a cross-web separator surrounded by a jacket layer according to one embodiment.
Figure 5:
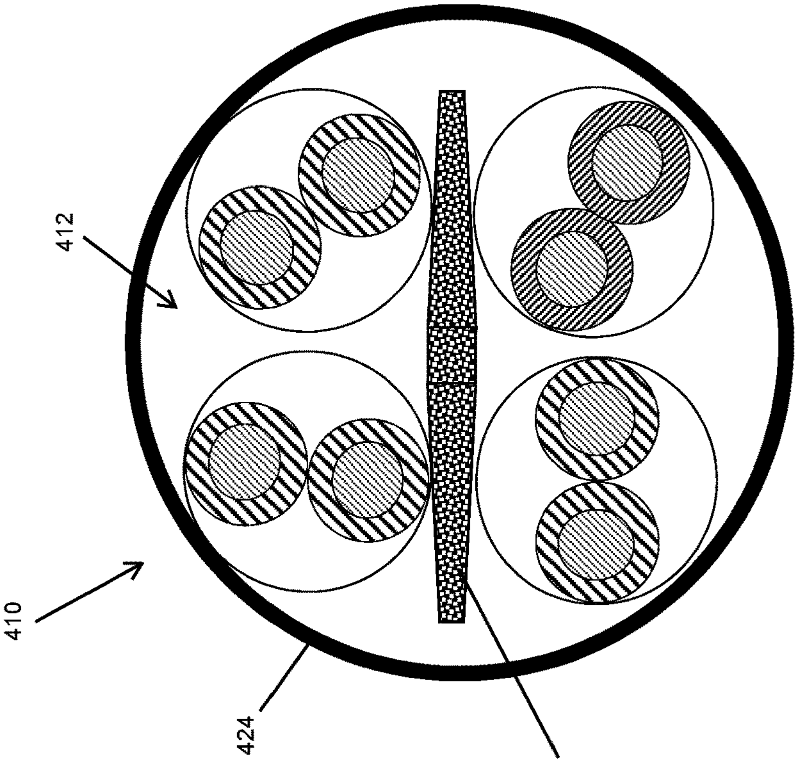
FIG. 5 depicts a cross-sectional view of a data communication cable having a cable core like that of FIG. 1 and further comprising a flat separator surrounded by a jacket layer according to one embodiment.

As can be appreciated, the data communication cables can include additional components in certain embodiments. For example, in certain embodiments, like those shown by FIGS. 5 and 6, a cable separator (e.g., 426, 526) can be included to further provide mechanical and electrical separation of the pairs. As shown in FIG. 5, the data communication cable 410 can include a flat separator 426 in the cable core 412, while FIG. 6 depicts a similar data communication cable 510 having a cross-web separator 528 in the cable core 512. Use of a cable separator can improve the electrical performance characteristics of the data communication cable and can, for example, enable the cable to meet the performance requirements of Category 6 or Category 6A cables. In certain embodiments, suitable cable separators can be formed of a low-smoke polymer, such as PVC; flame-retardant, zero-halogen polyolefins; and polyethersulfone. In certain embodiments, suitable cable separators can be formed of compositions as disclosed in U.S. Pat. No. 10,246,639. It will be appreciated, however, that a cable separator can be formed from any of a variety of suitable materials in any of a variety of suitable shapes or configurations. In certain embodiments, the cable separator can be made of a foamed or solid material.

Generally, the data communication cables described herein can be constructed in a process similar to known data communication cables. For example, the data communication cables can be formed by twisting insulated electric conductors together to form both pairs and a cable core. Optionally, a cable separator can be further included within the cable core. A jacket layer can then be extruded around the cable core.

EXAMPLES

Table 1 shows FRPP-based material formulations for each of Comparative Examples ("CE") CE1-CE9 and Inventive Example ("IE") IE1, where the amount of each component is provided in phr.

TABLE 1

FRPP-Based Material Example Formulations

| Component | CE1 | CE2 | CE3 | CE4 | CE5 | CE6 | CE7 | CE8 | CE9 | IE1 |
|---|---|---|---|---|---|---|---|---|---|---|
| Polypropylene Heterophase Copolymer | 87 | 67 | 67 | 67 | 67 | 67 | 67 | 67 | 43.5 | 67 |
| Polypropylene Random Copolymer | | | | | | | | 20.0 | 43.5 | |
| Polypropylene Homopolymer | | 20.0 | 20.0 | 20.0 | 20.0 | 20.0 | 20.0 | | | 20.0 |
| Polyproylene-g-MAH | 13.0 | 13.0 | 13.0 | 13.0 | 13.0 | 13.0 | 13.0 | 13.0 | 13.0 | 13.0 |
| Magnesium Hydroxide | 78.3 | 78.3 | 59 | 39 | 39 | 20 | | 20 | 20 | |
| Talc | 26.1 | 26.1 | 20.0 | 13.0 | 26.1 | 26.1 | 26.1 | 26.1 | 26.1 | 39 |
| N,N-ethylenebis(tetrabromophthalimide) | 21.7 | 21.7 | 16 | 10 | 21.7 | 21.7 | 21.7 | 21.7 | 21.7 | 32 |
| Antimony Trioxide | 6.0 | 6.0 | 4.5 | 3.0 | 6.0 | 6.0 | 6.0 | 6.0 | 6.0 | 9.0 |
| Antioxidant | 0.8 | 0.8 | 0.8 | 0.8 | 0.8 | 0.8 | 0.8 | 0.8 | 0.8 | 0.8 |
| Processing Aid | 4.8 | 4.8 | 4 | 3.4 | 4 | 3.6 | 3.2 | 3.6 | 3.6 | 3.6 |

In Table 1, the polypropylene heterophase copolymer is a copolymer obtained by Catalloy process technology and having a melting enthalpy of about 27 J/g and a melt flow rate of about 0.7 g/10 min. The polypropylene random copolymer has a melting enthalpy of about 67 J/g and a melt flow rate of about 1.8 g/10 min. The polypropylene homopolymer has a melt flow rate of about 3.5 g/10 min. The polypropylene-g-MAH is a polypropylene copolymer grafted with maleic anhydride (polar-modified polypropylene copolymer). Magnesium hydroxide is a hydrated mineral flame-retardant. Talc acts as a char former. N,N-ethylene-bis(tetrabromophthalimide) is a halogenated flame-retardant, and antimony trioxide is a flame-retardant additive.

Table 2 shows results relating to testing of each of CE1-CE9 and IE1 in form of different sample types. For example, sample type 1 is a 14 AWG conductor with a 0.25 mm-thick single layer of insulation. Sample type 2 is a 1 mm-thick extruded tape of insulating material. Sample type 3 refers to a 23 AWG data communication cable. In Table 2, the cable is provided in a 3×1 configuration, where the insulation (0.241 mm thick, single layer) for three of the pairs (i.e., first pairs) was formed from FEP material and the insulation for the remaining pair (i.e, second pair) was formed from the respective example FRPP-based material, with a flat separator formed of smoke-suppressant PVC and a low-smoke PVC jacket layer.

Burn performance is tested in accordance with the National Fire Protection Association (NFPA) standards, specifically NFPA 262 (2011). In such testing, smoke performance is measured by the average optical density and peak optical density of smoke. The UL 1581 VW-1 (2001) vertical flame test requires cables to extinguish a flame within 60 seconds after a specified flame is applied to the cable. Additionally, a paper sample located above the cable should not catch on fire. Samples are required to pass at least 3 consecutive samples to pass the respective flame tests.

In Table 2, the values in parentheses under the test name, when present, indicate the sought result (as in the case of dielectric constant) or the standard requirement.

As shown in Table 2, the material of IE1 allowed the respective sample to pass VW-1 testing and the smoke testing and meet the requisite standards for each of tensile strength, elongation at break, and modulus. The dielectric constant of the material of IE1 is lower than 2.6. None of the materials of CE1-CE9 were able to meet all of such standards. For example, only the material of CE7 exhibited a dielectric constant of less than 2.6, but the material of CE7 failed to pass VW-1 flame test. IE1 clearly outperformed CE1-CE9 when used as insulation for a twisted wire pair.

Table 3 shows results relating to testing of each of CE1 and IE1. As noted in Table 3, the sample type used for burn performance testing is sample type 3. For the results in Table 3, the data communication cables were formed in a 2×2 configuration, where the insulation for two of the pairs (i.e., first pairs) was formed from FEP and the insulation for the remaining two pairs (i.e., second pairs) were formed from the respective example FRPP-based materials. As with the results for Table 2, each data communication cable also included a flat separator formed of smoke-suppressant PVC and a low-smoke PVC jacket layer. Similarly, for tunnel testing, the respective example insulation composition was formed on a conductive wire and tested without a separator or jacket layer. As noted above, burn performance is tested in accordance with the National Fire Protection Association (NFPA) standards, specifically NFPA 262. In such testing, smoke performance is measured by the average optical density and peak optical density of smoke.

TABLE 2

Results from Testing of FRPP-Based Material Example Formulations as Different Types of Insulation, Including Insulation for One Twisted Wire Pair in a 3 × 1 Configuration

| Test | Sample Type | CE1 | CE2 | CE3 | CE4 | CE5 | CE6 | CE7 | CE8 | CE9 | IE1 |
|---|---|---|---|---|---|---|---|---|---|---|---|
| Tensile Strength (min 8 MPa) | 1 | 18 | 16.5 | 17.6 | 18 | 16 | 16 | 19 | 17.5 | 19.8 | 17 |
| Elongation at break (min 100%) | 1 | 280 | 174 | 293 | 425 | 277 | 407 | 359 | 349 | 348 | 204 |
| 100% Modulus (min 14 MPa) | 1 | 13.7 | 15.5 | 15 | 13.7 | 14 | 13.5 | 15.7 | 15 | 17.7 | 16.3 |
| VW-1 Flame Test | 1 | Pass | Pass | Fail | Fail | Pass | Pass | Fail | Pass | Pass | Pass |
| Dielectric Constant ∈ ($<2.6$ @ 1 MHz) | 1 | 2.92 | 2.96 | 2.89 | 2.75 | 2.79 | 2.69 | 2.51 | 2.74 | 2.68 | 2.57 |
| Peak Smoke (max 0.5) | 3 | 0.29 | | | | | | | | | 0.303 |
| Average Smoke (max 0.15) | 3 | 0.05 | | | | | | | | | 0.043 |
| Flame Spread (max 150 cm) | 3 | 27.4 | | | | | | | | | 39.6 |
| 60-cm Tunnel Avg. Smoke Obscuration (%) | 2 | 25.4 | | 30.0 | 19.8 | 28.0 | 38.0 | 19.0 | | | 16.5 |

TABLE 3

Results from Testing of FRPP-Based Material Example Formulations as Insulation for Two Twisted Wire Pairs in a 2 × 2 Configuration

| Test | Sample Type | CE1 | IE1 |
|---|---|---|---|
| Peak Smoke (max 0.5) | 3 | 0.414 | 0.385 |
| Average Smoke (max 0.15) | 3 | 0.072 | 0.065 |
| Flame Spread (max 150 cm) | 3 | 100.5 | 94.5 |

As shown in Table 3, the insulation formed from IE1 allowed the respective sample to pass burn performance testing two times. While CE1 was also meet the requisite standards, IE 1 outperformed CE1 in each tested category.

Table 4 shows results relating to testing of each of CE1 and IE1. Sample type 3 data communication cables were formed in a 3×1 configuration, where the insulation for three of the pairs was formed from FEP and the insulation for the remaining pair was formed from the respective example insulation composition. The insulation of the two sample was sized in view of the dielectric constant of the insulating material CE1 and IE1.

TABLE 4

Measurements of FRPP-Based Material Example Formulations as Insulation for One Twisted Wire Pair in a 3 × 1 Configuration

| Test | IE1 | CE1 |
|---|---|---|
| Dielectric Constant ε (<2.6 @ 1 MHz) | 2.57 | 2.92 |
| Insulation Outer Diameter (mm) | 0.96 | 1.04 |
| Insulation Relative Volume | 100% | 124% |
| Insulation Thickness (mm) | 0.226 | 0.266 |

Table 4 shows measurements for each of CE1 and IE1 insulating layer, relative to the dielectric constant determined in Table 2. As shown in Table 4, an insulation layer made of the FRPP-based material according to the present disclosure can be manufactured with a reduced diameter and thickness and, accordingly, less of material than an insulation layer made of a comparative FRPP-based material having a greater dielectric constant because of the presence of a flame-retardant hydrated mineral filler.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any disclosed or claimed matter herein or that it alone, or in any combination with any other reference or references, teaches, suggests, or discloses any such matter. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A data communication cable for use in a plenum comprising:

a cable core comprising a plurality of pairs of twisted electric conductors, wherein at least one pair of twisted electric conductors of the plurality of pairs of twisted electric conductors is electrically insulated with a flame-retardant polypropylene (FRPP)-based material comprising:

a polymer base comprising 5-25 phr of a polypropylene homopolymer, 1-20 phr of a polar-modified polypropylene homopolymer or copolymer, and the remaining portion of the polymer base being formed from a polypropylene copolymer;

from 25 to 60 phr of a char enhancer;

a halogenated flame retardant; and a flame-retardant additive;

wherein the FRPP-based material is free from flame-retardant hydrated mineral filler; and a jacket layer surrounding the cable core.

2. The data communication cable of claim 1, wherein each of the plurality of pairs of twisted electric conductors is electrically insulated with the flame-retardant polypropylene (FRPP)-based material.

3. The data communication cable of claim 1, wherein at least another pair of twisted electric conductors of the plurality of pairs of twisted electric conductors is electrically insulated with a fluoropolymer material.

4. The data communication cable of claim 3, wherein the fluoropolymer material comprises fluorinated ethylene propylene ("FEP").

5. The data communication cable of claim 3, wherein the at least another pair of twisted electric conductors comprises three pairs of twisted electric conductors electrically insulated with a fluoropolymer material and the at least one pair of twisted electric conductors comprises one pair of twisted electric conductors electrically insulated with the FRPP-based material.

6. The data communication cable of claim 3, wherein the at least another pair of twisted electric conductors comprises two pairs of twisted electric conductors electrically insulated with a fluoropolymer material and the at least one pair of twisted electric conductors comprises two pairs of twisted electric conductors electrically insulated with the FRPP-based material.

7. The data communication cable of claim 3, wherein the at least another pair of twisted electric conductors comprises one pair of twisted electric conductors electrically insulated with a fluoropolymer material and the at least one pair of twisted electric conductors comprises three pairs of twisted electric conductors electrically insulated with the FRPP-based material.

8. The data communication cable of claim 1, wherein the data communication cable exhibits a dielectric constant of less than 2.6 as measured in accordance with American Society for Testing and Materials (ASTM) 4566-98.

9. The data communication cable of claim 1, wherein the polypropylene copolymer forming the remaining portion of the polymer base is a polypropylene heterophase copolymer.

10. The data communication cable of claim 1, wherein the char enhancer comprises talc.

11. The data communication cable of claim 1, wherein the FRPP-based material comprises from 25 to 60 phr of the halogenated flame retardant.

12. The data communication cable of claim 1, wherein the FRPP-based material comprises an amount of the halogenated flame retardant and an amount of the flame retardant additive that is 25% to 30% of the amount of the halogenated flame retardant.

13. The data communication cable of claim 1, wherein the flame retardant additive comprises antimony oxide.

14. The data communication cable of claim 1, wherein the jacket layer is made of a polymer material having an oxygen index of at least 40% as measured in accordance with ASTM D2863 (2012).

15. The data communication cable of claim 1, further comprising a cable separator, wherein the cable separator comprises a flame-retardant, low-smoke polymer material.

16. A data communication cable for use in a plenum comprising:

a cable core comprising a pair of twisted electric conductors that is electrically insulated with a flame-retardant polypropylene (FRPP)-based material comprising:

a polymer base comprising 5-25 phr of a polypropylene homopolymer, 1-20 phr of a polar-modified polypropylene homopolymer or copolymer, and the remaining portion of the polymer base being formed from a polypropylene copolymer;

from 25 to 60 phr of a char enhancer;

a halogenated flame retardant; and a flame-retardant additive;

wherein the FRPP-based material is free from flame-retardant hydrated mineral filler; and a jacket layer surrounding the cable core.

* * * * *